(12) United States Patent
Izawa et al.

(10) Patent No.: US 7,593,797 B2
(45) Date of Patent: Sep. 22, 2009

(54) CONTROL SYSTEM FOR ADJUSTABLE DAMPING FORCE DAMPER

(75) Inventors: Masaki Izawa, Saitama (JP); Takafumi Kato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 10 days.

(21) Appl. No.: 11/391,289

(22) Filed: Mar. 29, 2006

(65) Prior Publication Data
US 2006/0224286 A1    Oct. 5, 2006

(30) Foreign Application Priority Data
Mar. 30, 2005    (JP)    ............ P.2005-098166

(51) Int. Cl.
*F16F 9/00* (2006.01)
*B60G 17/00* (2006.01)

(52) U.S. Cl. .................. 701/37; 280/5.5; 280/6.15; 267/218

(58) Field of Classification Search ............ 701/37; 280/5.5, 5.515, 6.15, 43.17; 267/218; F16F 9/00; G06F 19/00
See application file for complete search history.

(56) References Cited

U.S. PATENT DOCUMENTS

| 5,203,584 A * | 4/1993 | Butsuen et al. ......... 280/5.519 |
| RE34,628 E * | 6/1994 | Fujishiro et al. ......... 280/5.519 |
| 5,371,598 A * | 12/1994 | Ghaem et al. .............. 356/617 |
| 5,400,245 A * | 3/1995 | Butsuen et al. .............. 701/37 |
| 5,497,324 A * | 3/1996 | Henry et al. .................. 701/37 |
| 5,828,970 A * | 10/1998 | Kimura et al. ............... 701/37 |
| 6,058,340 A * | 5/2000 | Uchiyama et al. ............ 701/37 |
| 6,208,920 B1 * | 3/2001 | Izawa et al. .................. 701/36 |
| 6,366,841 B1 * | 4/2002 | Ohsaku ....................... 701/37 |
| 6,611,743 B2 * | 8/2003 | Sakai .......................... 701/37 |
| 7,195,250 B2 * | 3/2007 | Knox et al. .............. 280/5.518 |
| 7,441,789 B2 * | 10/2008 | Geiger et al. .......... 280/124.16 |
| 2001/0037169 A1 * | 11/2001 | Clair .......................... 701/37 |

(Continued)

FOREIGN PATENT DOCUMENTS

| JP | 60-113711 A | 6/1985 |
| JP | 7-237420 A | 9/1995 |

OTHER PUBLICATIONS

Tsai, W.C., Chyn, C., Tsao, T.P, "Damping torsional oscillations due to network faults using the dynamic flywheel damper", Generation, Transmission and Distribution, IEE Proceedings-vol. 144, Issue 5, Sep. 1997 pp. 495-502.*

*Primary Examiner*—Tuan C To
(74) *Attorney, Agent, or Firm*—Arent Fox LLP

(57) ABSTRACT

A control system for a adjustable damping force damper includes a damper and a spring provided on a suspension apparatus of a vehicle, a sprung speed sensor for detecting speed of an upper member of the spring, the sprung speed is generated when the vehicle gets over steps on a road surface and a control unit for setting a gain so as to determine an damping force of the damper based on a product of the sprung speed and the gain. When an absolute value of the sprung speed exceeds a predetermined value, the control unit changes the gain in response to a positive sign or a negative sign of the sprung speed.

5 Claims, 6 Drawing Sheets

U.S. PATENT DOCUMENTS

2002/0045977 A1* 4/2002 Uchiyama et al. ............. 701/37
2003/0205867 A1* 11/2003 Coelingh et al. ............. 280/5.5
2004/0026879 A1* 2/2004 Schaumburg et al. ........ 280/5.5
2004/0154886 A1* 8/2004 Hio et al. .................... 188/266

* cited by examiner

CONTROL SYSTEM FOR ADJUSTABLE DAMPING FORCE DAMPER

The present invention claims foreign priority to Japanese patent application No. P.2005-098166, filed on Mar. 30, 2005, the contents of which is incorporated herein by reference.

BACKGROUND OF THE INVENTION

1. Field of the Invention

The present invention relates to a control system for a adjustable damping force damper, which controls variably an adjustable damping force of a damper provided to a suspension apparatus of a vehicle in response to a moving condition of the vehicle.

2. Description of the Background Art

In Japanese Patent Unexamined Publication No. JP-A-60-113711, the adjustable damping force damper in which MRF (Magneto-Rheological Fluids), whose viscosity is changed by applying a magnetic field, is employed as a viscous fluid of the adjustable damping force damper for the suspension apparatus and also a coil used to apply the magnetic field to the magneto-rheological fluids in the fluid passage is provided to a piston, which is slidably fitted into a cylinder, is known. According to this adjustable damping force damper, an damping force of this damper can be controlled arbitrarily by changing a viscosity of the magneto-rheological fluids in the fluid passage by applying the magnetic field generated by supplying an electric current to the coil.

In Japanese Patent Unexamined Publication No. JP-A-07-237420, in order to improve a ride performance when a vehicle comes down from steps, the control system for prohibiting a control that increases an damping force of the damper when a downward acceleration is detected is known.

By the way, in the case where the vehicle to which the skyhook control is applied gets over steps on a road surface, the passenger's feeling is different between in a case where the vehicle goes up onto the steps and in a case where the vehicle comes down from the steps. Therefore, when a gain of the skyhook control is set uniformly in both situations, there are undesirable possibilities that the passenger may feel uncomfortable and a ride performance may be deteriorated.

SUMMARY OF THE INVENTION

The present invention has been made in view of the above circumstances, and it is an object of the present invention to enhance a ride performance when a vehicle gets over steps.

In order to achieve the above object, according to a first aspect of the invention, there is provided a control system for a adjustable damping force damper, comprising:

a damper and a spring provided on a suspension apparatus of a vehicle;

a sprung speed sensor for detecting speed of an upper member of the spring, the sprung speed is generated when the vehicle gets over steps on a road surface; and a control unit for setting a gain so as to determine an damping force of the damper based on a product of the sprung speed and the gain, wherein, when an absolute value of the sprung speed exceeds a predetermined value, the control unit change the gain in response to a positive sign or a negative sign of the sprung speed. Also, according to a second aspect of the present invention, as set forth in the first aspect of the present invention, it is preferable that when the sign of the sprung speed is positive, the gain is set larger than a case where the sign of the sprung speed is negative.

According to a third aspect of the present invention, there is provided a control method for a adjustable damping force damper provided on a suspension apparatus of a vehicle, comprising the steps of:

detecting a sprung speed which is generated when the vehicle gets over steps on a road surface;

determining whether or not an absolute value of the sprung speed exceed a predetermined value, and changing a gain in response to a positive or negative sign of the sprung speed controlling the damping force in accordance with a product of the sprung speed and the gain.

According to a fourth aspect of the present invention, as set forth in the third aspect of the present invention, it is preferable that when the sign of the sprung speed is positive, the gain is set larger than a case where the sign of the sprung speed is negative.

According to a configuration of the first aspect of the present invention, when the absolute value of the sprung speed generated when the vehicle get over the steps on the road surface exceeds a predetermined value upon setting the damping force of the damper of the suspension apparatus based on a product of the sprung speed and the gain, the gain used to calculate a target damping force is changed in response to a sign of the sprung speed. Therefore, a difference of the passenger's feeling, that is different between a case where the vehicle goes up onto the big steps and a case where the vehicle comes down from the big steps, can be solved by changing an damping force of the damper 14.

According to a configuration in the second aspect of the present invention, when the sign of the sprung speed is positive, the gain is set larger than a case where the sign of the sprung speed is negative. Therefore, since an increase of the sprung speed is permitted by increasing the damping force of the damper when the vehicle goes up onto the steps, the ride performance can be enhanced by dissolving a passenger's uncomfortable feeling such that the passenger feels to rise from the seat.

DETAILED DESCRIPTION OF THE PREFERRED EMBODIMENTS

An implementation mode of the present invention will be explained based on an embodiment of the present invention shown in the accompanying drawings hereinafter.

Figure 1:
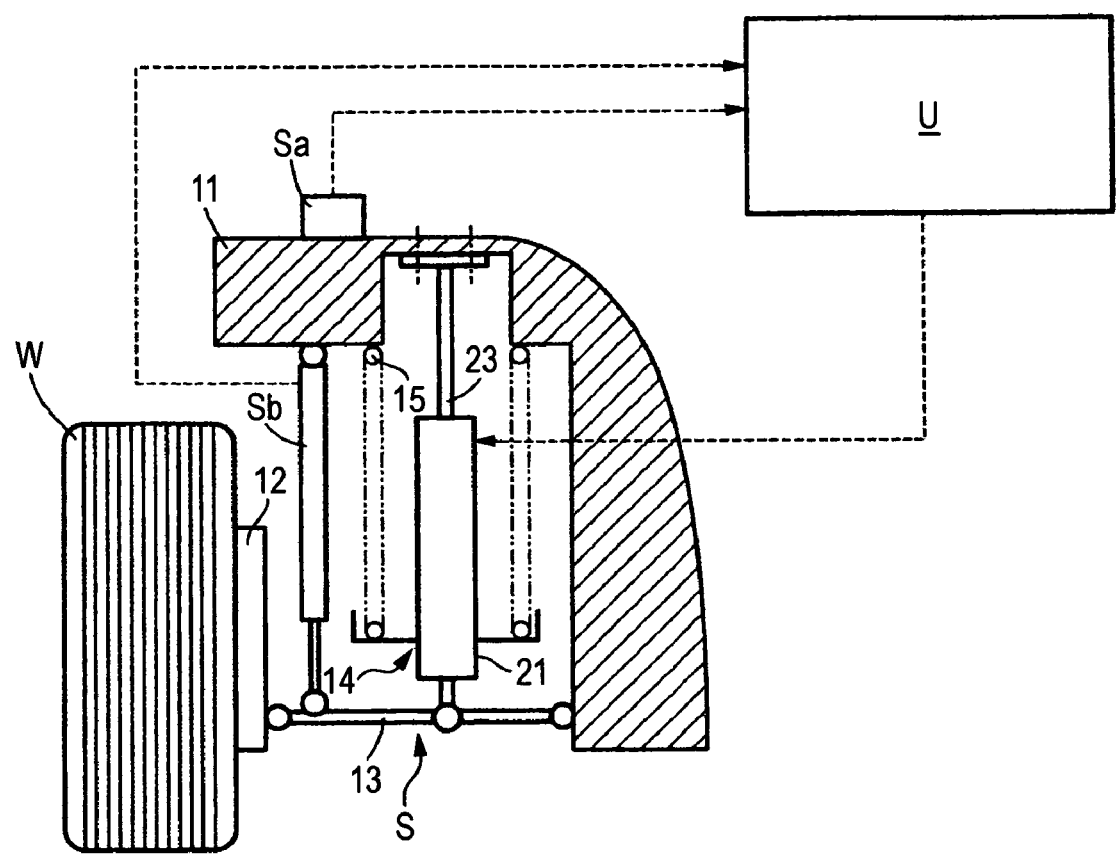
FIG. 1 is a front view of a suspension apparatus of a vehicle.
Figure 2:
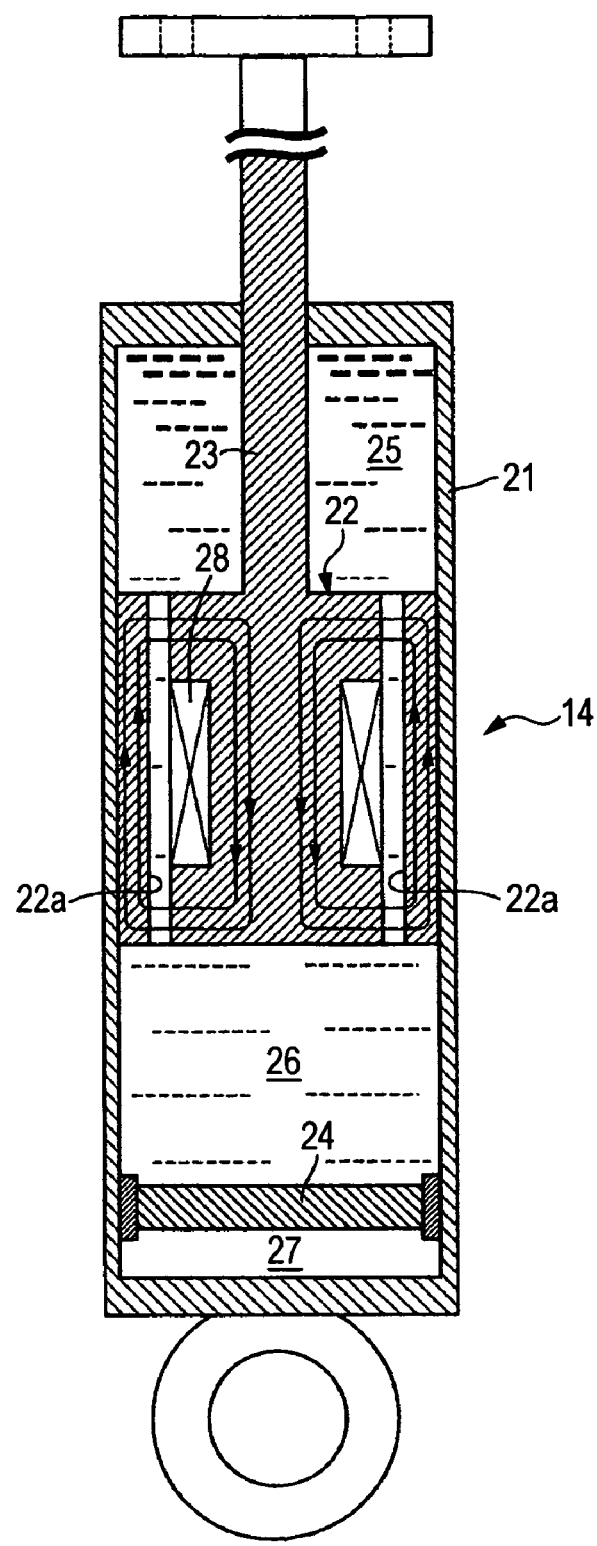
FIG. 2 is an enlarged sectional view of a adjustable damping force damper.
Figure 3:
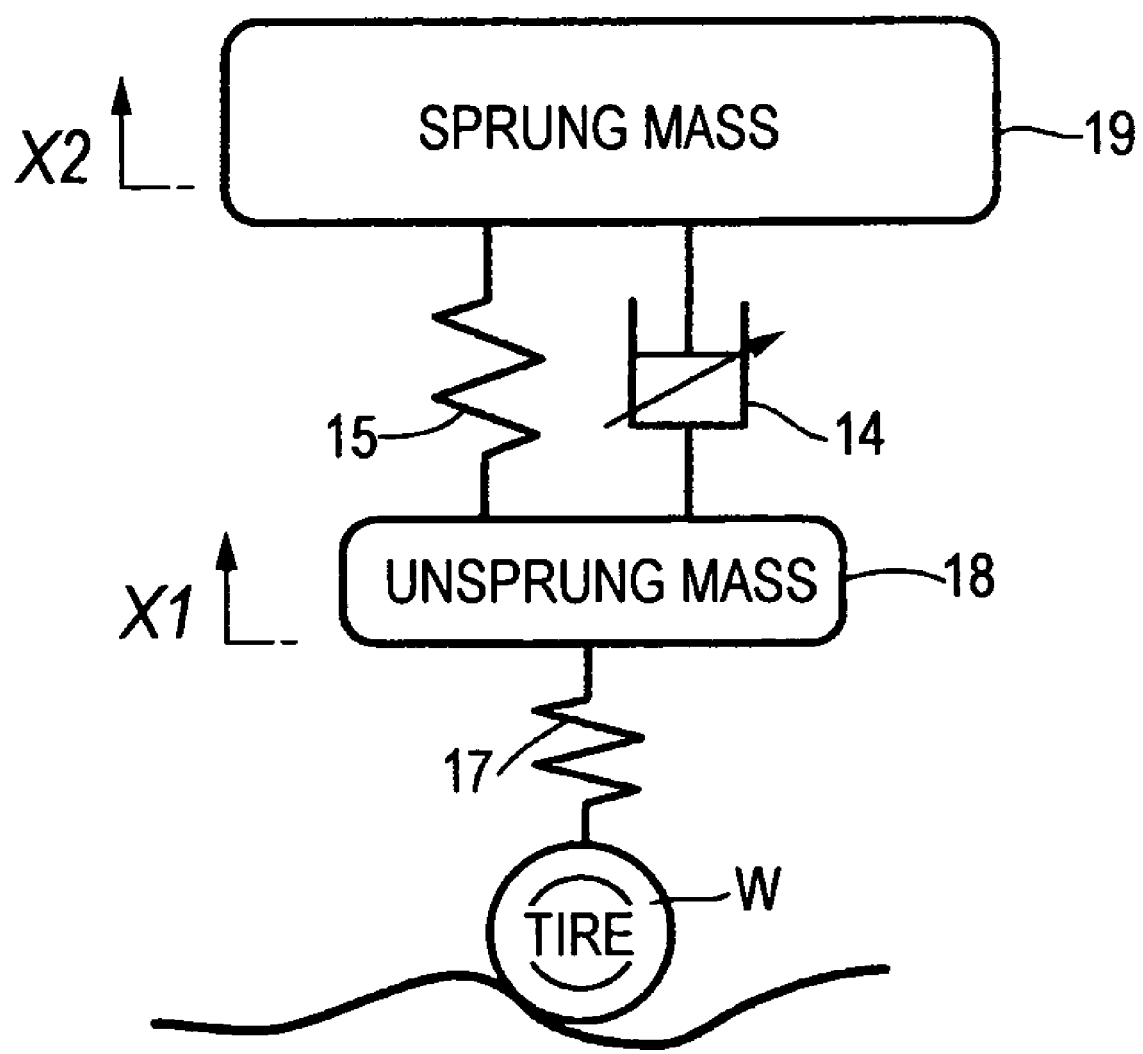
FIG. 3 is a view showing a model of a suspension apparatus.
Figure 4:
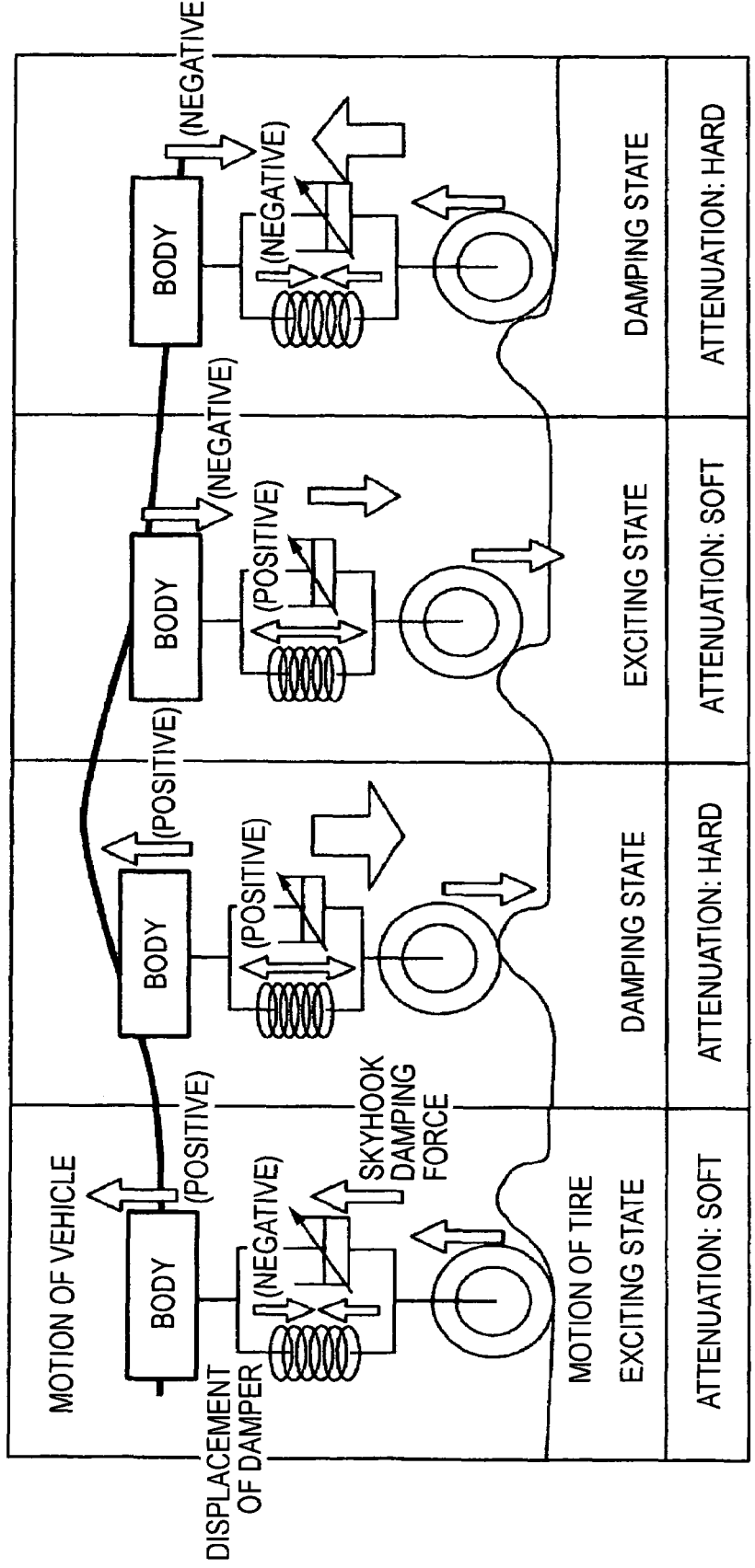
FIG. 4 is an explanatory view of skyhook control.
Figure 5:
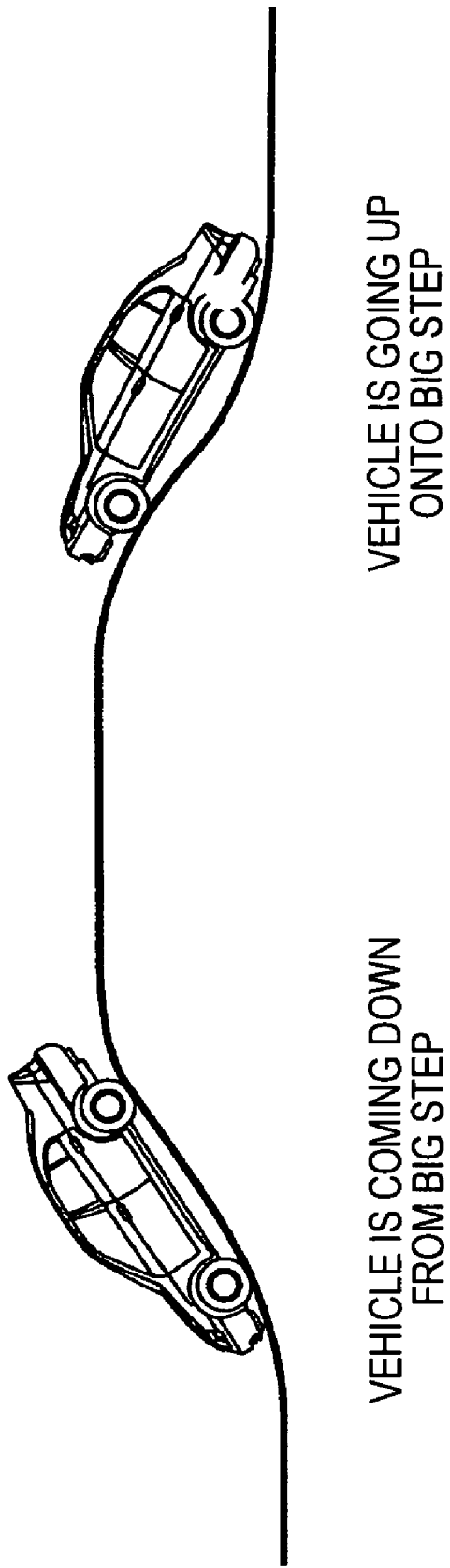
FIG. 5 is a view showing a state that a vehicle goes up onto steps and comes-down from the steps.
Figure 6:
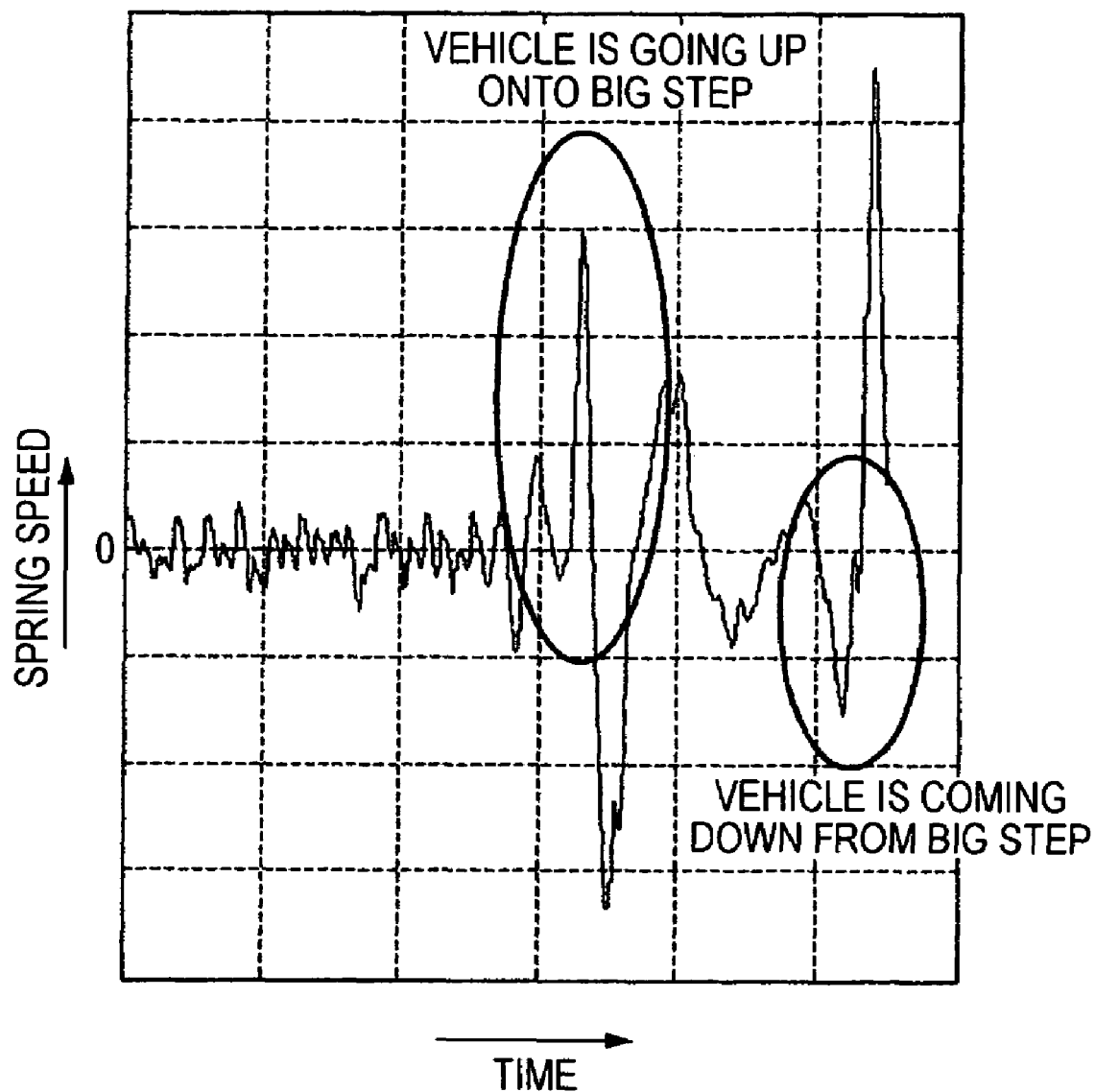
FIG. 6 is a graph showing a sprung speed when the vehicle goes up onto steps comes down from steps.

FIG. 1 to FIG. 6 show an embodiment of the present invention. FIG. 1 is a front view of a suspension apparatus of a vehicle, FIG. 2 is an enlarged sectional view of a adjustable damping force damper, FIG. 3 is a view showing a model of a suspension apparatus, FIG. 4 is an explanatory view of skyhook control, FIG. 5 is a view showing a state that a vehicle goes up onto steps and a state that a vehicle comes down from steps, and FIG. 6 is a graph showing a sprung speed when the vehicle goes up onto steps and when the vehicle comes down from steps.

As shown in FIG. 1, a suspension apparatus S that suspends a wheel W of a four-wheel vehicle includes a suspension arm 13 for supporting a knuckle 12 vertically and movably onto a vehicle body 11, a adjustable damping force damper 14 for connecting the suspension arm 13 and the vehicle body 11, and a coil spring 15 for connecting the suspension arm 13 and the vehicle body 11. A signal from a sprung acceleration sensor Sa that detects a sprung acceleration, and a signal from a damper displacement sensor Sb that senses a displacement (stroke) of the damper 14 are input into an electronic control unit U that controls a adjustable damping force of the damper 14.

As shown in FIG. 2, the damper 14 has a cylinder 21 whose lower end is connected to the suspension arm 13, a piston 22 fitted slidably into the cylinder 21, a piston rod 23 extended upward from the piston 22 to pass through an upper wall of the cylinder 21 and connect its upper end to the vehicle body, and a free piston 24 fitted slidably into a bottom portion of the cylinder. An upper-side first fluid chamber 25 and a lower-side second fluid chamber 26 are partitioned by the piston 22 in the cylinder 21, and also a gas chamber 27 into which a compressed gas is sealed is partitioned under the free piston 24.

A plurality of fluid passages 22a . . . are formed in the piston 22 to cause an upper surface and a lower surface to communicate with each other, and the first and second fluid chambers 25, 26 are communicated mutually via these the fluid passages 22a . . . . The magneto-rheological fluids sealed in the first and second fluid chambers 25, 26 and the fluid passages 22a . . . is constituted by dispersing fine grains of the magnetic material such as iron powders into the viscous fluid such as oil. The magneto-rheological fluids has such a property that, when a magnetic field is applied, the fine grains of the magnetic material are aligned along lines of magnetic force and thus the viscous fluid is hard to flow to yield an increase in an apparent viscosity. A coil 28 is provided to an inside of the piston, and a current supply to the coil 28 is controlled by the electronic control unit U. When current is supplied to the coil 28, magnetic fluxes are generated as indicated with an arrow shown in FIG. 2 and then the viscosity of the magneto-rheological fluids is changed by the magnetic fluxes passing through the fluid passages 22a . . . .

When the damper 14 is contracted and then the piston 22 moves downward in the cylinder 21, a volume of the first fluid chamber 25 is increased but a volume of the second fluid chamber 26 is decreased. Therefore, the magneto-rheological fluids in the second fluid chamber 26 flows into the first fluid chamber 25 to pass through the fluid passages 22a . . . in the piston 22. On the contrary, when the damper 14 is expanded and then the piston 22 moves upward in the cylinder 21, a volume of the second fluid chamber 26 is increased but a volume of the first fluid chamber 25 is decreased. Therefore, the magneto-rheological fluids in the first fluid chamber 25 flows into the second fluid chamber 26 to pass through the fluid passages 22a . . . in the piston 22. At that time, the damper 14 generates an damping force by a viscous resistance of the magneto-rheological fluids passing through the fluid passages 22a . . . .

At this time, when a magnetic field is generated by supplying a current to the coil 28, an apparent viscosity of the magneto-rheological fluids that pass through the fluid passages 22a . . . in the piston 22 is increased, and thus the fluids are hard to pass through the fluid passage 22a . . . . Therefore, an damping force of the damper 14 is increased. An amount of increase in this damping force can be controlled freely by amplitude of a current that is supplied to the coil 28.

In this case, when a volume of the second fluid chamber 26 is decreased because an impulsive compressive load is applied to the damper 14, the free piston 24 is moved downward while causing the gas chamber 27 to contract, so that an impact can be absorbed. Conversely, when a volume of the second fluid chamber 26 is increased because an impulsive tensile load is applied to the damper 14, the free piston 24 is moved upward while causing the gas chamber 27 to expand, so that an impact can be absorbed. In addition, when a volume of the piston rod 23 fitted in the cylinder 21 is increased because the piston 22 is moved downward, the free piston 24 is moved downward to absorb an amount of increase in the volume.

Then, the electronic control unit U controls individually an damping force of four dampers 14 . . . of respective wheels W . . . in total based on a sprung acceleration detected by the sprung acceleration sensor Sa, a damper displacement detected by the damper displacement sensor Sb, and the like. Accordingly, the electronic control unit U executes selectively the ride control such as the skyhook control, which enhances a riding feeling by suppressing the motion of the vehicle when such vehicle gets over unevenness on a road surface, or the like and the driving stability control, which suppresses a rolling caused at a time of the vehicle turning and a pitching caused at a time of rapid acceleration or rapid deceleration, in response to the driving condition of the vehicle.

Next, the skyhook control to enhance a ride performance by suppressing a motion of the vehicle will be explained based on FIG. 3 and FIG. 4 hereunder.

As apparent from a model of the suspension apparatus shown in FIG. 3, an unsprung mass 18 is connected to the road surface via a virtual spring 17 of a tire, and a sprung mass 19 is connected to the unsprung mass 18 via the damper 14 and the coil spring 15. An damping force of the damper 14 can be changed by supplying a current to the coil 28. A rate of change $dX2/dt$ of a displacement $X2$ of the sprung mass 19 corresponds to a sprung speed that is obtained by integrating an output of the sprung acceleration that is detected by the sprung acceleration sensor Sa. Also, a rate of change $d(X2-X1)/dt$ of a difference between a displacement $X2$ of the sprung mass 19 and displacement $X1$ of the unsprung mass 18 corresponds to a damper speed that is obtained by differentiating an output of the damper displacement sensor Sb.

When $dX2/dt \times d(X2-X1)/dt > 0$ is satisfied, i.e., the sprung speed and the damper speed are in the same direction (have the same sign), the damper 14 is controlled in the direction to increase an damping force. In contrast, when $dX2/dt \times d(X2-X1)/dt \leq 0$ is satisfied, i.e., the sprung speed and the damper speed are in the opposite direction (have the opposite sign), the damper 14 is controlled in the direction to decrease an damping force.

Accordingly, suppose the case where the wheel W goes across the projection on the road surface, as shown in FIG. 4. As shown in (1), when the vehicle body 11 is moved upward while the wheel W is lifted along a first half of the projection, a sprung speed ($dX2/dt$) has a positive value. But the damper 14 is compressed and a damper speed $d(X2-X1)/dt$ has a negative value. Therefore, both speeds have the opposite sign and the damper 14 is controlled to decrease an damping force in the compressing direction.

Also, as shown in (2), when the vehicle body 11 is still moved upward through inertia immediately after the wheel W went across a top of the projection, a sprung speed ($dX2/dt$) has a positive value. But the damper 14 is expanded because the vehicle body 11 is lifted, and a damper speed d(X2−X1)/dt has a positive value. Therefore, both speeds have the same sign and the damper 14 is controlled to increase an damping force in the expanding direction.

Also, as shown in (3), when the vehicle body 11 is moved downward while the wheel W is fallen down along a second half of the projection, a sprung speed (dX2/dt) has a negative value. But the damper 14 is expanded because the wheel W is fallen down more rapidly than the vehicle body 11, and a damper speed d(X2−X1)/dt has a positive value. Therefore, both speeds have the opposite sign and the damper 14 is controlled to decrease an damping force in the expanding direction.

Also, as shown in (4), when the vehicle body 11 is still moved downward through inertia immediately after the wheel W went across the projection perfectly, a sprung speed (dX2/dt) has a negative value. But the damper 14 is compressed because the wheel W stops to fall down, and a damper speed d(X2−X1)/dt has a negative value. Therefore, both speeds have the same sign and the damper 14 is controlled to increase an damping force in the compressing direction.

In the above skyhook control, a target damping force to be generated in the damper 14 is calculated by Target damping force=gain×sprung speed based on the sprung speed and the gain.

By the way, as shown on the right side of FIG. 5, as explained in (1) of FIG. 4, when the vehicle goes up onto the steps on the road surface, the vehicle body 11 is moved upward and a sprung speed (dX2/dt) has a positive value, but the damper 14 is compressed and a damper speed d(X2−X1)/dt has a negative value. Therefore, both speeds have the opposite sign and the damper 14 is controlled to decrease an damping force in the compressing direction, and thus an upward movement of the vehicle body 11 is suppressed. At this time, the seated passenger is still going to move upward through inertia, but an upward movement of the vehicle body 11 is suppressed. As a result, the passenger feels as if he or she rises from a seat, and often has an uncomfortable feeling.

Conversely, as shown on the left side of FIG. 5, as explained in (3) of FIG. 4, when the vehicle comes down from the steps on the road surface, the vehicle body 11 is moved downward and a sprung speed (dX2/dt) has a negative value, but the damper 14 is expanded because the wheel W is fallen down more rapidly than the vehicle body 11 and a damper speed d(X2−X1)/dt has a positive value. Therefore, both speeds have the opposite sign and the damper 14 is controlled to decrease an damping force in the expanding direction, and thus a downward movement of the vehicle body 11 is suppressed. At this time, the seated passenger is still going to move downward through inertia, but a downward movement of the vehicle body 11 is suppressed. As a result, the passenger feels as if he or she is pressed against the seat, but hardly has an uncomfortable feeling rather than the case where the passenger feels as if he or she rises from the seat when the vehicle goes up onto the steps.

In this case, it can be decided whether the vehicle went up onto the steps or the vehicle came down from the steps, based on a sign of sprung speed as shown in FIG. 6. Namely, this is because a positive sprung speed is detected when the vehicle goes up onto the steps and a negative sprung speed is detected when the vehicle comes down from the steps.

In this manner, in the case where the vehicle went up onto the steps on the road surface, the passenger seems to have an uncomfortable feeling on the contrary if an upward movement of the vehicle body 11 is strongly suppressed by the skyhook control. Therefore, in such case it is desirable that the skyhook control should be weakened.

When the vehicle gets over a relative small step, the passenger does not feel the aforementioned uncomfortable much. However, when the vehicle gets over a relative large step, the passenger feels aforementioned uncomfortable greatly.

When the vehicle gets over the large step, large upper strung speed is detected. Then, according to the present invention, a threshold value is set relative to the upper strung speed as a predetermined value. When an absolute value of the upper strung value is larger than the predetermined value, the skyhook control is controlled so as to be weaken.

More concretely, when the vehicle went up onto the big steps and then the sprung speed that is in excess of a predetermined value was detected, an damping force of the damper 14 is increased by correcting the gain used in calculating a target damping force of the damper 14 to increase larger than the ordinary gain (containing the gain when the vehicle comes down from the steps). A situation brought about at a moment when the vehicle goes up onto the steps is similar to (1) of FIG. 4. At this time, the damper 14 is controlled by the skyhook control such that an damping force in the compressing direction is reduced, so that an upward pushing motion of the wheel W acts not to push up the vehicle body 11. In the present embodiment, an damping force of the damper 14 is corrected in the increasing direction in contrast to the normal skyhook control, so that the damper 14 is hard to deform in the compressing direction. Therefore, an upward pushing motion of the wheel W acts to push up the vehicle body 11, whereby an amount of upward movement of the vehicle body 11 is increased. As a result, the passenger who is going to move upward through inertia is difficult to have a rising feeling from the seat, and thus the ride performance can be enhanced by dissolving a passenger's uncomfortable feeling.

In other words, when determining G as the gain, V as the upper sprung speed, and V0 as the predetermined value, when |V|≧V0, if the vehicle moves upwardly (V>0), the gain G is set as G1, and if the vehicle moves downwardly (V<0), the gain G is set as G2.

In this case, by setting G1 to be larger than G2, when the vehicle moves upwardly, the target damping force is controlled so as to be large.

As described above, when an absolute value of the sprung speed generated by the steps on the road surface exceeds a predetermined value, a gain used to calculate a target damping force is changed in response to a sign of the sprung speed. Therefore, a difference of the passenger's feeling that is different when the vehicle goes up onto the big steps and when the vehicle comes down from the big steps can be solved by changing an damping force of the damper 14.

With the above, the embodiment of the present invention is explained. But various changes of design can be applied to the present invention within a scope that does not depart from a gist of the invention.

For example, in the embodiment, damping force of the damper 14 . . . is adjustably controlled by using the magnetorheological fluids. But an approach of adjustably controlling damping force can be chosen freely.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A control system for an adjustable damping force damper, comprising:
- a damper and a spring provided on a suspension apparatus of a vehicle;
- a sprung speed sensor configured to detect speed of an upper member of the spring, the sprung speed being generated when the vehicle goes over bumps on a road surface; and
- a control unit configured to set a gain so as to determine a damping force of the damper based on a product of the sprung speed and the gain,
- wherein, when an absolute value of the sprung speed exceeds a predetermined value, the control unit changes the gain differently in response to a positive sign than in response to a negative sign of the sprung speed, and
- wherein the gain when the sign of the sprung speed is positive is larger than the gain when the sign of the sprung speed is negative.

2. The control system for the adjustable damping force damper according to claim 1, wherein, when the sign of the sprung speed is positive, the gain is set larger than a case where the sign of the sprung speed is negative.

3. The control system for the adjustable damping force damper according to claim 1, wherein the damper and spring are located between a sprung mass and an unsprung mass, wherein the sprung mass is connected to the unsprung mass via the damper and the spring, and wherein the unsprung mass is connected to the road surface via a virtual spring of a tire.

4. The control system for the adjustable damping force damper according to claim 3, wherein the sprung speed corresponds to a rate of change of a displacement of the sprung mass.

5. The control system for the adjustable damping force damper according to claim 4, wherein the gain corresponds to a rate of change of a difference between the displacement of the sprung mass and a displacement of the unsprung mass.

* * * * *